(12) United States Patent
Baker

(10) Patent No.: US 11,074,502 B2
(45) Date of Patent: Jul. 27, 2021

(54) EFFICIENTLY BUILDING DEEP NEURAL NETWORKS

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/620,052

(22) PCT Filed: Aug. 12, 2019

(86) PCT No.: PCT/US2019/046178
§ 371 (c)(1),
(2) Date: Dec. 6, 2019

(87) PCT Pub. No.: WO2020/041026
PCT Pub. Date: Feb. 27, 2020

(65) Prior Publication Data
US 2021/0049470 A1    Feb. 18, 2021

Related U.S. Application Data

(60) Provisional application No. 62/721,754, filed on Aug. 23, 2018.

(51) Int. Cl.
G06N 3/08     (2006.01)
G06N 3/04     (2006.01)
G06N 3/063    (2006.01)

(52) U.S. Cl.
CPC ........... *G06N 3/082* (2013.01); *G06N 3/0454* (2013.01); *G06N 3/063* (2013.01)

(58) Field of Classification Search
CPC ...... G06N 3/084; G06N 20/20; G06N 3/0454; G06N 5/046; G06N 3/063; G06N 3/082
See application file for complete search history.

(56) References Cited

U.S. PATENT DOCUMENTS

| 6,128,606 A | 10/2000 | Bengio et al. |
| 2013/0110752 A1* | 5/2013 | Robinson ............. G06N 3/02 706/20 |

(Continued)

FOREIGN PATENT DOCUMENTS

| WO | WO 2018/063840 A1 | 4/2018 |
| WO | WO 2018/175098 A1 | 9/2018 |

(Continued)

OTHER PUBLICATIONS

Vincent et al., "Stacked Denoising Autoencoders: Learning Useful Representations in a Deep Network with a Local Denoising Criterion", Dec. 10, 2010, Journal of Machine Learning Research 11, pp. 3371-3408 (Year: 2010).*

(Continued)

*Primary Examiner* — Kamran Afshar
*Assistant Examiner* — Brent Johnston Hoover
(74) *Attorney, Agent, or Firm* — K&L Gates LLP

(57) ABSTRACT

A computer system uses a pool of predefined functions and pre-trained networks to accelerate the process of building a large neural network or building a combination of (i) an ensemble of other machine learning systems with (ii) a deep neural network. Copies of a predefined function node or network may be placed in multiple locations in a network being built. In building a neural network using a pool of predefined networks, the computer system only needs to decide the relative location of each copy of a predefined network or function. The location may be determined by (i) the connections to a predefined network from source nodes and (ii) the connections from a predefined network to nodes in an upper network. The computer system may perform an iterative process of selecting trial locations for connecting arcs and evaluating the connections to choose the best ones.

60 Claims, 5 Drawing Sheets

(56) References Cited

U.S. PATENT DOCUMENTS

| | | |
|---|---|---|
| 2017/0132513 A1 | 5/2017 | Yu et al. |
| 2018/0204111 A1 | 7/2018 | Zadeh et al. |
| 2019/0095798 A1 | 3/2019 | Baker |
| 2020/0364571 A1* | 11/2020 | Xu ............................ G06N 3/08 |

FOREIGN PATENT DOCUMENTS

| | | |
|---|---|---|
| WO | WO 2018/194960 A1 | 10/2018 |
| WO | WO 2018/226492 A1 | 12/2018 |
| WO | WO 2018/226527 A1 | 12/2018 |
| WO | WO 2018/231708 A2 | 12/2018 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

Tong et al., "Software defect prediction using stacked denoising autoencoders and two-stage ensemble learning", Apr. 2018, Information and Software Technology, vol. 96, Apr. 2018, pp. 94-111 (Year: 2018).*

Lawrence et al., What Size Neural Network Gives Optimal Generalization? Convergence Properties of Backpropagation, 2014, International Journal of Multimedia and Ubiquitous Engineering, vol. 9, No. 8, pp. 149-156 (Year: 2014).*

International Search Report and Written Opinion of the International Searching Authority for International Application No. PCT/US2019/046178 dated Oct. 24, 2019.

* cited by examiner

EFFICIENTLY BUILDING DEEP NEURAL NETWORKS

PRIORITY CLAIM

The present application is a national stage application under 35 U.S.C. § 371 of PCT application Serial No. PCT/US19/46178, filed Aug. 12, 2019, which claims priority to U.S. Provisional Patent Application Ser. No. 62/721,754, filed Aug. 23, 2018, both having the same title and inventor as set forth above, and both of which are incorporated herein by reference in their entirety.

BACKGROUND

Machine learning systems, especially deep neural networks, have had some remarkable successes in recent years in classification problems in artificial intelligence. There has also been significant progress in implementing the training of deep neural networks to run efficiently, such as in parallel processing on graphics processing units (GPUs). However, difficult classification problems require large neural networks, and large neural networks require large amounts of training data. Thus, the required amount of computation time to train a large neural network remains a significant barrier to further progress in developing the technology of artificial intelligence. Computational limitations are also a problem building and training other large machine learning systems, especially large ensembles of machine learning systems.

SUMMARY

The present invention, in one general aspect, is directed to a machine-learning computer system that uses a pool of predefined functions and pre-trained networks to accelerate the process of building a large neural network or building a combination of (i) an ensemble of other machine learning systems with (ii) a deep neural network. Copies of a predefined function node or network may be placed in multiple locations in a network being built. In building a neural network using a pool of predefined networks, the computer system only needs to decide the relative location of each copy of a predefined network or function. The location may be determined by (i) the connections to a predefined network from source nodes and (ii) the connections from a predefined network to nodes in an upper network. In various aspects of the present invention, the computer system performs an iterative process of selecting trial locations for connecting arcs and evaluating the connections to choose the best ones. The process of evaluating a potential placement of a predefined function or network can be a relatively efficient computational process. Various embodiments of the present invention can be used to accelerate the process of building and training a large machine learning system in a wide variety of applications.

FIGURES

Various embodiments of the present invention are described herein by way of example in conjunction with the following figures.

DETAILED DESCRIPTION

Figure 1:
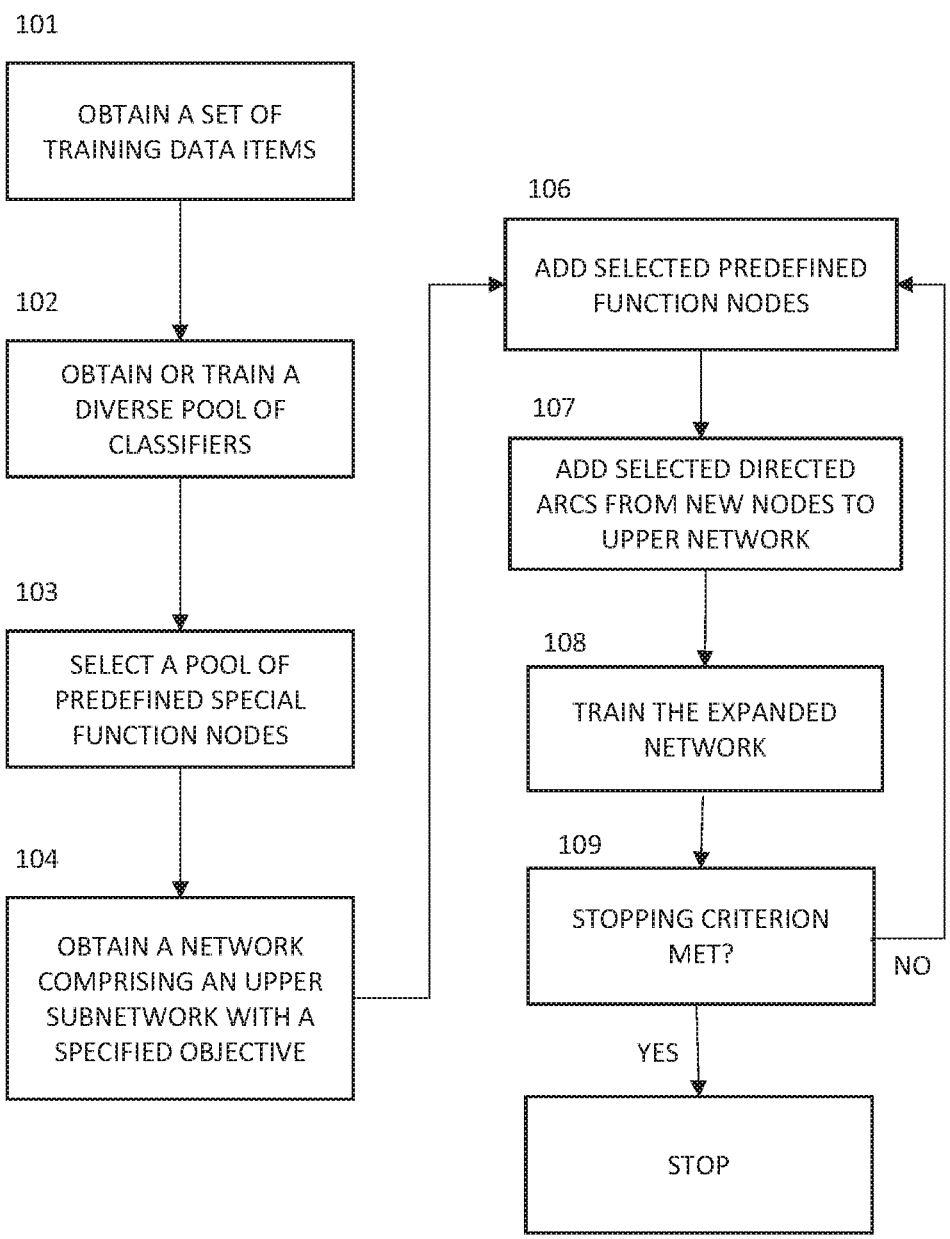
FIGS. 1 and 2 are flow charts of an illustrative embodiment of the invention.
Figure 2:
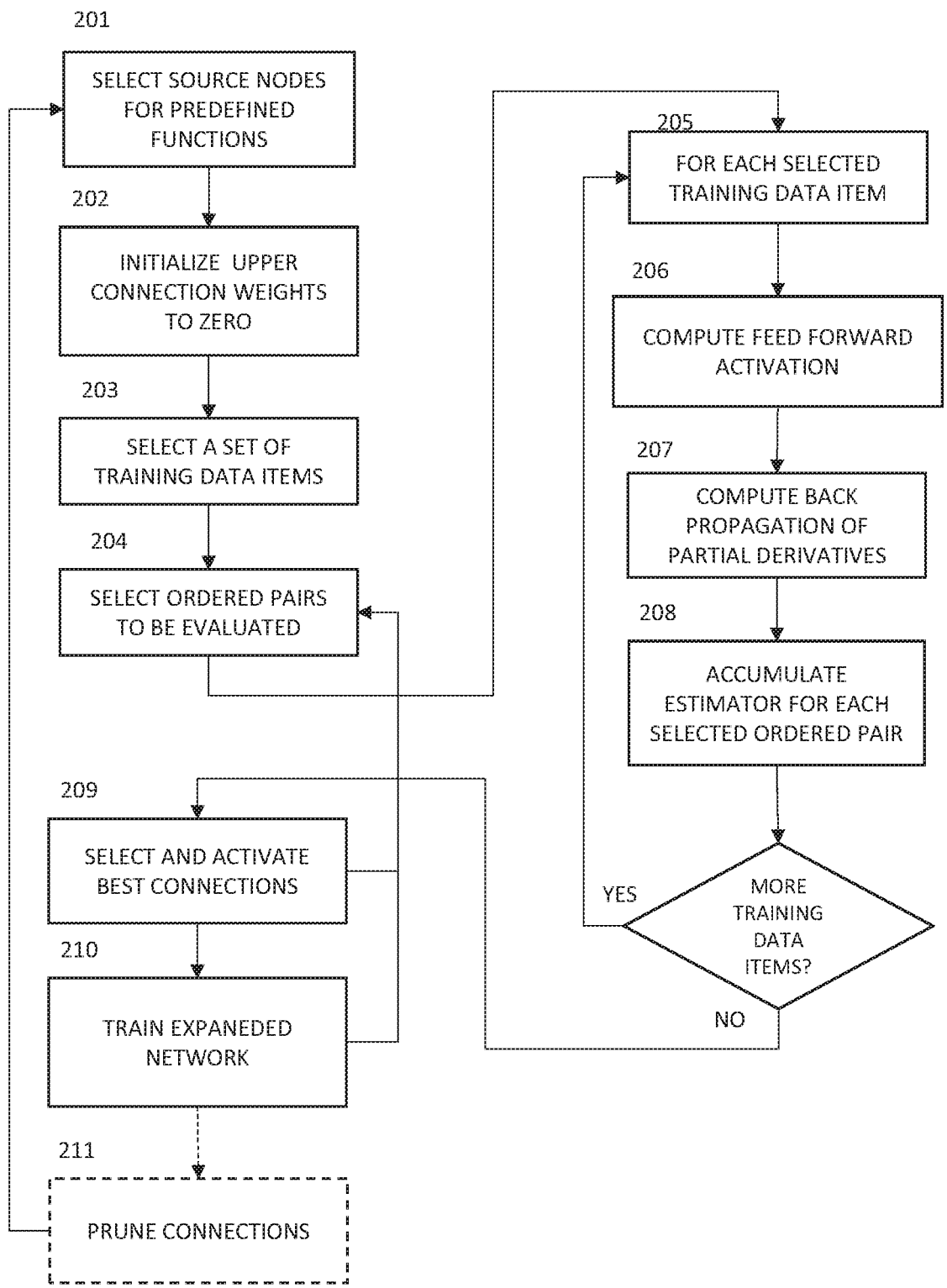
Figure 3:
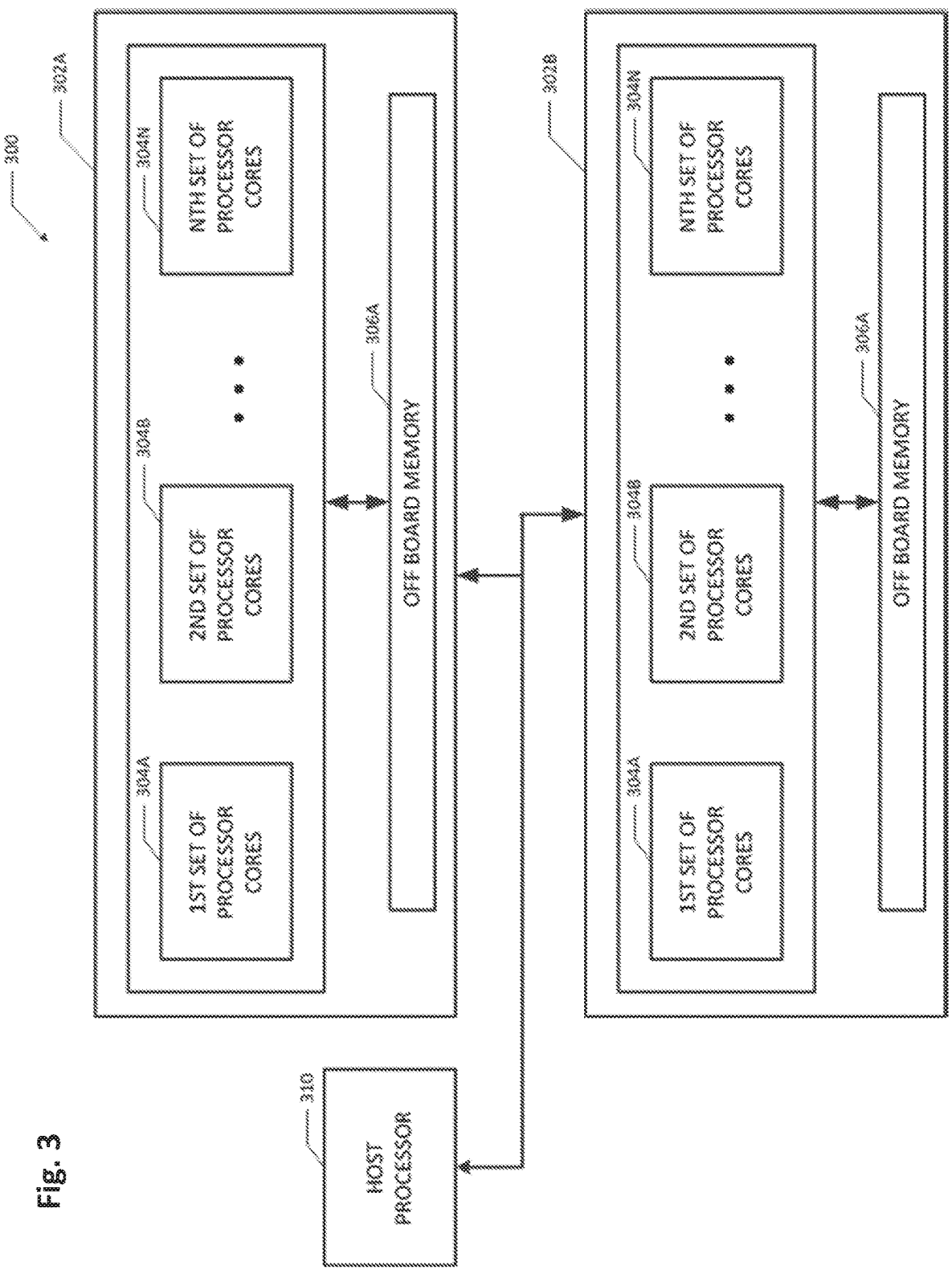
FIG. 3 is a system diagram of a computer in that may be used to implement various embodiments of the invention, including performance of the processes illustrated in the flow charts of FIGS. 1 and 2.

FIGS. 1 and 2 are flow charts of an illustrative embodiment of the invention that may be implemented on a computer system such as illustrated in FIG. 3. The discussion of FIGS. 1 and 2 is in the context of the system diagram of an illustrative embodiment shown in FIG. 5.

Figure 4:
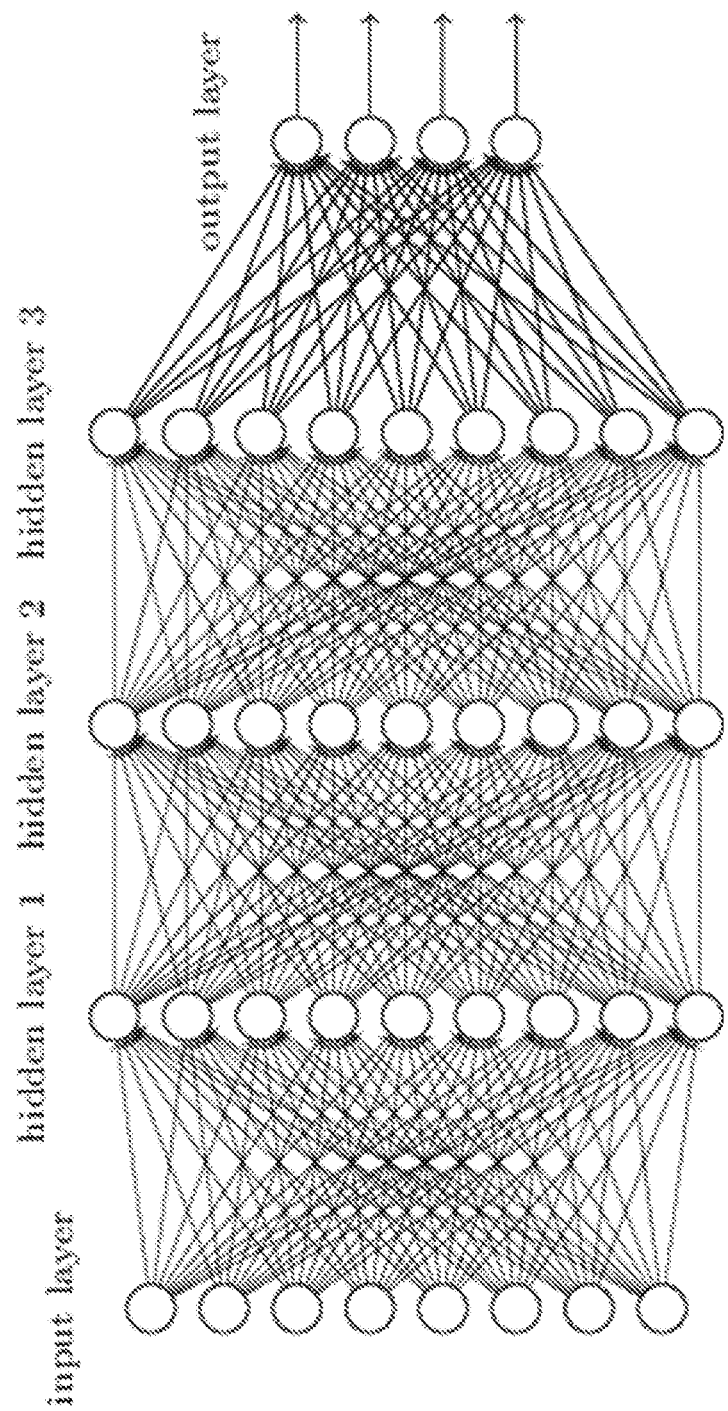
FIG. 4 is an illustrative drawing of a type of neural network that may be used as a subsystem in various embodiments of the invention.
Figure 5:
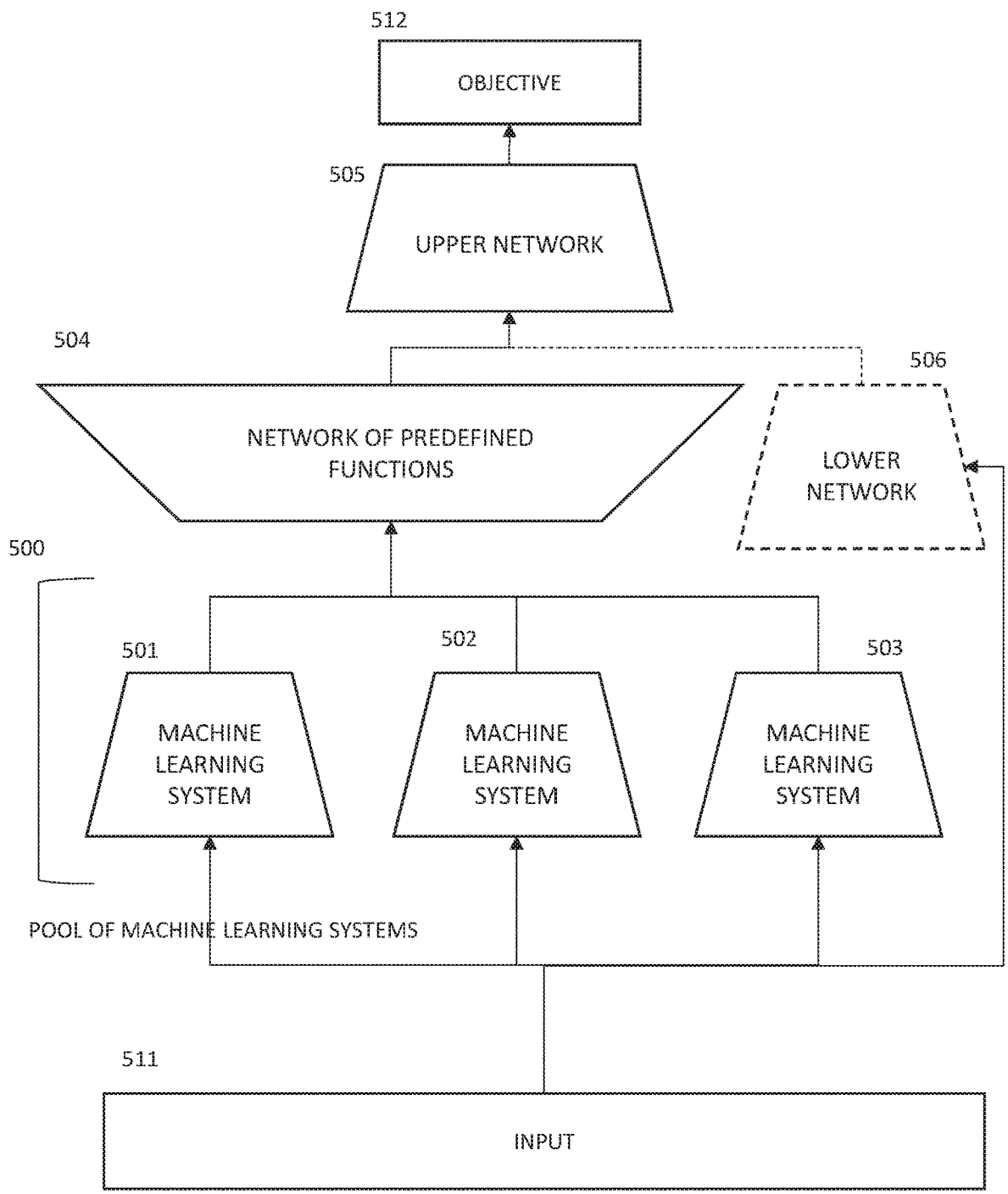
FIG. 5 is a schematic system diagram of the arrangement of subsystems in an illustrative embodiment of the invention.

In the illustrative embodiment shown in FIGS. 1 and 2, the computer system builds a machine learning system (sometimes referred to herein as a "composite machine learning system" or "composite network") out of subsystems such as illustrated in FIG. 5. Preferably, the upper network 505 together with an optional lower network 506 is a multi-layer feed-forward neural network such as illustrated in FIG. 4. Preferably, the combined network comprising lower network 506 and upper network 505 is trained using the same objective 512 that is to be used for the composite machine learning system being built. In some embodiments, the subsystem (or "middle network") 504 between the upper network 505 and the pool of machine learning systems 500 is a multi-layer feed-forward neural network built out of predefined functions. The feed-forward network 504 may be a neural network such as shown in FIG. 4. Subsystem 500 comprises a pool of machine learning systems 501, 502, and 503. Each member 501-503 of the pool of machine learning systems 500 may or may not be a neural network. Although three machine learning systems 501, 502, and 503 are shown, the pool of machine learning systems 500 may have any number of member machine learning systems. In some embodiments, the upper network 505 is an entire network, directly connected to the input 511 and lower network 506 is not present. In some embodiments, the lower network 506 overlaps with or is part of the pool of machine learning systems 500. As the network of predefined functions 504 is built and trained, the subsystems 500 and 504 will supplement, and in some embodiments replace, the lower network 506. In some embodiments, the subsystem 506 is a machine learning system of a type other than a neural network.

The building process illustrated in FIGS. 1 and 2 starts by obtaining or by training from scratch the pool of machine learning systems 500 and the upper network 505 before populating subsystem 504 with predefined functions. The process of populating the subsystem 504 preferably comprises an iterative process of selecting predefined functions and, for each predefined function, determining its connections from the pool of machine learning systems 500 (or, after subsystem 504 is partially built, from lower layers of subsystem 504) and its connection into the upper network 505. The iterative building process builds a multi-layer network 504 from the predefined functions.

In step 101, the computer system obtains a set of training data. The computer system may obtain the set of training data by any conventional and/or suitable means. For example, the training data may be down- or up-loaded into a memory of the computer system.

In step 102, the computer system obtains or trains a set of machine learning systems that herein are referred to as the "pool of machine learning systems" (subsystem 500 of FIG.

5). Preferably, each machine learning system 501-503 of FIG. 5 will be a classifier or detector or will at least have a node that indicates a particular classification category or the detection of a particular feature. For the purpose of discussion, it will be assumed that presence of a category or feature is indicated of by a node activation value of 1 and the absence by a node activation value of 0, but in some embodiments other representations may be used.

In some embodiments, each of the members of the pool of machine learning systems 500 is a neural network. For purpose of discussion, each output value of a machine learning system in the pool of machine learning systems 500 is associated with an output node, although the machine learning system may or may not be a neural network. Whether the members 501-503 of the pool of machine learning systems 500 are neural networks or not, the computer system preferably uses a neural network as an upper network 505 in the system being built.

Without loss of generality, the members 501-503 of the pool of machine learning systems 500 share the same input 511 as shown in FIG. 5. That is, the set of "shared" input values 511 is the union of the sets of input values of the individual members of the pool of machine learning system 500 and any individual machine learning system 501-503 may be restricted to a specified subset of this shared set 511.

Preferably the members 501-503 of the pool of machine learning systems 500 comprise nodes that are diverse relative to each other. In a preferred embodiment, the diversity of the pool of machine learning systems 500 is indicated by the total of distinct detection targets for output nodes or other specified detection nodes among the members 501-503 of the pool of machine learning systems 500. More details about building deep learning ensembles with diverse targets can be found in (i) International Application No. PCT/US19/41992, filed Jul. 16, 2019, entitled "Robust Von Neumann Ensembles for Deep Learning" and (ii) International Application No. PCT/US19/46107, filed Aug. 12, 2019, entitled, Building Deep Learning Ensembles with Diverse Targets, both of which are incorporated herein by reference in their entirety.

A quantitative aspect of the pool of machine learning systems that is relevant to the following discussion is the total number of specified nodes that satisfy the diversity condition, counting all output nodes and specified inner nodes of all the members 501-503 of the pool 500. Remember, only three machine learning systems 501-503 are shown in FIG. 5 for illustrative purposes.

Let the total number of specified diverse nodes in the machine learning systems 501-503 be represented by the letter D. The number D is a characteristic of the pool of machine learning systems 500 as a whole. It is independent of characteristics of the individual members 501-503, except as they contribute to the total number of specified diverse nodes.

In some embodiments, the members 501-503 of the pool of machine learning systems 500 are not disjoint but may share elements. For example, in the case of members 501-503 that are neural networks, the members of the pool are not necessarily separate networks, but instead some of the members 501-503 may be subnetworks of a combined network comprising several members 501-503, with each subnetwork 501-503 associated with different output nodes within the combined network. When the members 501-503 of the pool of machine learning system share subnetworks or subsystems, D represents the total number of distinct specified diverse nodes.

Various embodiments achieve diversity among the pool of machine learning systems using a variety of methods. For example, in some embodiments, a member, e.g., member 501, of the pool of machine learning systems 500 may be trained to recognize a different classification category from other members, e.g., member 502 and 503, of the pool of machine learning systems 500. As another example, in some embodiments, each member 501-503 of the pool of machine learning systems 500 may be a member of an ensemble of machine learning systems that have been trained to be diverse as part of the ensemble training.

In step 103, the computer system selects a pool of predefined functions. As used herein, a "predefined function" is a function implemented, for example, as a neural network node with a predefined function as its activation function together with a directed arc for each input variable of the function, with a specified value for the node bias and for the connection weight associated with each of incoming directed arcs. A "predefined function" may also be embodied as a small network of nodes with specified biases and weights, preferably with a designated output node as the function node. Thus, as used herein, a "subnetwork element" that implements a predefined function is a single node or a small network of nodes that implement the predefined function.

As an illustrative example, the pool of predefined functions could comprise implementations of each of the five independent binary Boolean functions: A AND B, A OR B, A but not B, B but not A, A XOR B as a neural network node. These five functions are used as examples in the following discussion. For example, the first four of these Boolean functions may be implemented using the following weights and biases:

$\text{sigmoid}(x)=1/(1+\exp(-x));$

AND: bias=−15, w1=10, w2=10;
OR: bias=−5, w1=10, w2=10;
A but not B: bias=−5, w1=10, w2=−10;
B but not A: bias=−5, w1=−10, w2=10
(where w1 is the weight for input A and w2 is the weight for input B).

The XOR function is more complex. Its implementation requires a two-layer network, with two nodes in the first layer and one node in the second layer. There are several ways to implement XOR on such a network. One example is to have an A and not B node and a B and not A node in the first layer, and then have the two first layer nodes connected to an OR node in the second layer. These five Boolean functions, together with their complements, and the unary and constant functions are sufficient to build any arbitrarily complex Boolean function.

As another illustrative example, the pool of predefined functions could be a basis for building other function classes. For example, the unary function $f(x)=x^2$, along with ordinary n-ary linear nodes with variable weights can, with multiple layers, compute any polynomial. In some embodiments, additional predefined functions, such as the identity function $f(x)=x$ and the difference function $f(x,y)=x-y$, may be included for convenience in compactly representing functions that are useful in a particular application. However, the functions $f(x)=x$ and $f(x,y)=x-y$ may also be implemented as examples of general n-ary linear nodes.

As yet another illustrative example, any previously trained neural network can be used as a predefined function. In some embodiments, the number of layers in such a previously trained network may be limited. For example, the number of layers may be limited to two, with more complex functions to be built with multiple layers of the predefined functions, as with above example of the polynomials. In other embodiments, the number of layers in a previously trained network may be unlimited but the selection of previously trained networks may be limited to a specified finite set.

In step 104, the computer system obtains or constructs a neural network as an upper network 505 for the system being built. Preferably, where a pre-existing complete network comprising 506 and 505 is used, the combination of the networks 505 and 506 is trained to the same objective 512 that is the specified objective of the system being built.

As shown in FIG. 1, steps 106-108 are repeated until a stopping criteria is met. In step 106, the computer system adds nodes or small networks ("subnetwork elements") representing predefined functions layer-by-layer to a network 504 between pool of machine learning systems 500 and the upper network 505 obtained in step 104. That is, there could be n=1, . . . , N iterations, where each iteration adds the nth layer to the middle network 504. In a preferred embodiment, the predefined functions added to the network 504 in a single pass through the loop (i.e., steps 106-108 for the nth iteration) are not connected to each other. In this embodiment, the computer system may process all the selected predefined functions in step 106 in parallel. In this embodiment, the computer system will also be able to process the directed arcs to be added in step 107 in parallel. A predefined function added in step 106 may have incoming directed arcs from any specified diverse node in the pool of machine learning systems 500 and/or from any node in a lower layer of network 504. That is, for the n=1 iteration, each of the subnetwork elements for the added predefined functions are connected to a diverse node in the pool of machine learning systems. In subsequent iterations (n=2, . . . , N), each of the subnetwork elements for the added predefined functions in the nth iteration are connected to either (i) a diverse node in the pool of machine learning systems and/or (ii) a node in a one of the layers 1 to n−1 (i.e., a layer lower than the nth layer). A predefined function in network 504 may have an outgoing directed arc to any node in the upper network 505.

For example, in the first layer of network 504, with D specified diverse nodes in the pool of machine learning systems 500, the number of predefined functions defined by the five Boolean functions that are distinct in either functionality or in position in the network is $V=5*D*(D-1)/2$, because each unordered pair of specified diverse nodes is a distinct position. That is, there can be up to V predefined function nodes in the first layer of network 504. If the computer system uses parallel processing, such as on a graphics processing unit (GPU), it is practical to have 1,000 or more specified diversity nodes D. Then V is greater than 2 million, which may be impractical or at least very inefficient and expensive in both computer time and memory. Therefore, in many embodiments, the computer system may select only a fraction of the potential positions for predefined function nodes to be actively connected to a node in the upper network. This selection process is discussed in association with FIG. 2.

If there are V distinct potential predefined functions and N nodes in the upper network, then there are N*V potential connections from the output of a predefined function to a node in the upper network 505. Each potential connection is represented by an ordered pair <f, d>, where f is a predefined function node in network 504 and d is a node in upper network 505.

In step 107, the computer system selects ordered pairs of nodes between the subnetwork elements added in the nth iteration and nodes in the upper network 505 for which to add directed arcs to the network. The computer system initializes the connection weight to zero for these selected directed arcs and makes the weight associated with the directed arc active in the iterative update process for the combined network (e.g., the network 505, the middle network 504, optionally the pool 500, and the lower network 506 if present). The selection-and-training process for the arcs is explained in more detail in association with FIG. 2.

In step 108, the computer system trains the new directed arcs as it continues training of the upper network 505, preferably with an iterative training procedure such as stochastic gradient descent with minibatch updates based on partial derivatives estimated by feed-forward activation and back-propagation of the partial derivatives, which is well-known to those skilled in the art of training neural networks. In some embodiments, the weights associated with the directed arcs in a predefined function are not updated. Instead, they are left at their defined values. In some embodiments the weights associated with the directed arcs in a predefined function are updated during the iterative training updates. In some embodiments in which a member (e.g., member 501) of the pool of machine learning systems 500 is a neural network, the learned parameters of that neural network are updated based on back-propagation of the estimated partial derivatives through the upper network 505, then through the network 504 of the predefined functions, and then backwards through network of the member (e.g., member 501) of the pool of machine learning systems 500. This process is explained in more detail in association with FIG. 2.

After step 108, the computer system determines at step 109 whether the stopping criteria are met. If not, the process returns to step 106 to repeat the loop from step 106 to step 108 to add a new layer to the middle network 504. If stopping criterion is met, the process is complete and is stopped. There is no theoretical limit to the number of potential directed arcs that may be selected in step 107 and trained in step 108. However, there are several reasons that not all N*V potential new directed arcs are selected and made active for training at once. First there is the practical limit that with a large value of D, only a small fraction of N*V can be evaluated at once. Second, in step 209 of the detailed procedure illustrated in FIG. 2, the computer system selects the most promising connections to make active for training first. This process is more efficient, uses less computation and builds a smaller, more computationally efficient network than would result from making a larger set of directed arcs active at once. Third, each sequential pass through the loop from step 106 to step 108 may add an extra layer to the network 504 being built between the pool of machine learning systems 500 and the upper network 505. More layers of a neural network 504 enable the neural network 504 to compute or approximate more complex functions.

The stopping condition at step 109 may be, for example: (i) that a specified number of iterations of the loop have been completed, (ii) that performance on a validation test has degraded by more than a specified amount, (iii) that a limit on the size of the network (e.g., the number of nodes and/or directed arcs) has been reached. Note that, because each pass through the loop from step 106 to step 108 adds additional nodes and arcs, the fact that the training of the existing learned parameters has converged is not necessarily a criterion for stopping since the current parameters values are not necessarily a stationary point for the larger network.

In fact, in some embodiments, the computer system stops the training of the learned parameters in step 108 before convergence because the existing learned parameters will continue to be trained along with the new parameters in further passes through the loop from 106 to 108. Preferably in these embodiments, the computer system trains all the learned parameters to convergence in the final pass through the loop from step 106 to step 108.

FIG. 2 shows an illustrative embodiment of steps 106 to 108 from FIG. 1 in more detail. The loop from step 211 back to step 201, to select source nodes for more predefined functions, represents the return from step 108 of FIG. 1 back to step 106 of FIG. 1 (assuming the stopping criteria is not met). Steps 201 through 203 correspond to step 106 in FIG. 1. Steps 204 through 209 correspond to step 107 of FIG. 1. Steps 210 and 211 correspond to step 108 in FIG. 1.

In step 201, the computer system selects predefined functions and their source nodes to potentially be added to network 504 of FIG. 5. The number of candidate selections and the selection criterion may be set by the system designer based on the intended application and the computer resources available. For example, if the total number of diverse nodes D is small, in some embodiments, the computer system may select all possible predefined functions. However, in some embodiments, the computer system may select only a small fraction of the available predefined function and source node combinations. In some embodiments, the source node positions may be selected at random. In some embodiments, the system designer may specify a source node position selection that systematically tries different choices of source nodes during multiple passes through the loop from step 201 to step 211.

In step 202, the computer system initializes the associated weights for all potential directed arcs from a predefined function node in network 504 to a node in upper network 505.

In step 203, the computer system selects a set of training data items. These training data items are to be used to accumulate a statistical estimator in step 207. The data items may be selected at random or by a systematic selection process determined by the system designer. The number of data items should be sufficient for the statistical estimator in step 207 to be sufficiently accurate. A reasonable choice for the number of data items is from one to five times the size of a minibatch used in training the neural networks, say in the range of 100 to 500 data items.

In step 204, the computer system selects a subset of the ordered pairs <f, d>, where f is a predefined function node in network 504 (i.e., the node or output node of a combination of nodes (i.e., "subnetwork element") in the network 504 that implements predefined function) and d is a node in upper network 505 such there is no directed arc from the function node f to node d that is already being actively trained. The selection may include any function node f in network 504. However, in some embodiments function nodes f that have been created in step 206 in the current pass/iteration through the loop from step 205 to step 208 may be preferred and may have a higher probability of being selected in comparison to function nodes added in prior passes/iterations.

The purpose of the loop from step 205 to step 208 is to compute an estimate of the partial derivative of the objective 512 with respect to the weight (initialized to the value 0) to be associated with each of the directed arcs selected for evaluation in step 204.

In step 205, the computer system controls a loop that executes steps 205 through 208 for each training data item selected in step 203.

In step 206, the computer system computes the output for each of the subsystems in FIG. 5 for the training data item specified in step 205. For subsystems networks 504, 505, 506, and any of the members 501-503 of the pool 500 of machine learning systems that are neural networks, the computer system performs a feed-forward activation computation to compute the activation of each node in the network. The feed-forward activation computation is well-known to those skilled in the art of training neural networks.

In step 207, the computer system performs a back-propagation computation for the networks 505 and 504. A back-propagation computation estimates partial derivatives of the objective 512 with respect to elements of a neural network by applying the chain rule of calculus, proceeding backwards through the network. The back-propagation computation is well-known to those skilled in the art of training neural networks. In step 207, this back-propagation computation is not being performed as part of training the neural networks. In step 207, the back-propagation is used to compute partial derivatives that will be used in the estimators in step 208.

In step 208, the computer system computes, in one embodiment,
Act(f, t)*∂J/∂Input(d, t) for each ordered pair selected in step 204. Act(f, t) is the feed-forward activation of node f for training data item t, computed in step 206. ∂J/∂Input(d, t) is the partial derivative of the objective J (512 in FIG. 5, e.g., the objective used to train the upper network 505 before addition of the middle network 504) with respect to the input to node d for training data item t, computed in step 207. The computer system accumulates this quantity into a running sum $\Delta(f, d, T) = \Sigma_{t=1,T}(Act(f, t)*\partial J/\partial Input(d, t))$.

After step 208, as shown in FIG. 2, control returns to step 205 until all training data items selected in step 203 have been processed, then control passes to step 209.

In step 209, the computer system selects some of the ordered pairs <f, d> selected in step 204 to become active directed arcs in the composite network being built. In preferred embodiments, this selection is based at least in part on the absolute value of the quantity computed in step 208, that is |Δ(f, d,T)|. The quantity Δ(f, d, T) is an estimate of the partial derivative of the objective 512 with respect to the connection weight to be associated with the directed arc being created between function node f in the middle network 504 and node d in the upper network 505. The larger the magnitude of this partial derivative, whether the partial derivative is positive or negative, the better. That is, directed arcs with a great magnitudes of the partial derivative are more likely to be selected than directed arcs with lesser magnitudes of the partial derivative. For example, in some embodiments, directed arcs whose magnitude of the partial derivative is above some threshold value are selected. Alternatively, the directed arcs could be ranked in descending order, with the top X selected or the top X % selected. The value of X could change based on the iteration (e.g., pass through steps 205-208). In some embodiments additional criteria may be used in the selection. For example, nodes in certain layers may be preferred for selection, such as the lowest layer in upper network 505 and the most recently added layers in network 504.

The total number of ordered pairs <f, d> that may potentially be selected as new directed arcs can be very large. In some embodiments, in step 204, the computer system only selects a small fraction of these potential new directed arcs to be evaluated by the loop from step 205 to step 208. In some embodiments, after step 209, the computer system may return to step 204 to select more candidate ordered pairs to evaluate. The number of times to return to step 204 rather than proceed to step 210 may be controlled by hyperparameters and may be based on considerations such as the total number of available ordered pairs and the number of ordered pairs that can practically be evaluated in available parallel computer processing hardware. This consideration balances practical limitations with the amount of computation and the performance of the end results. In various embodiments, the decision of how many times to return to step 204 may be based on other considerations in addition to or instead of this practical consideration. In some embodiments, a decision may be based in part on the values of $|\Delta(f, d, T)|$. For example, if the values of $|\Delta(f, d, T)|$ for pairs selected in previous rounds have been relatively higher compared to the values of $|\Delta(f, d, T)|$ currently available, there may be less need to examine additional pairs. In some embodiments, the decision to select more pairs may be based in part on the progress in achieving improved values for the objective 512.

In some embodiments, similar considerations may arise in the computer system returning directly to step 204 after completing step 210.

In step 210, the computer system performs supervised training on the networks 505, 504, and 506 with the connections selected in step 209 added between predefined function nodes in network 504 and nodes in upper network 505. This training may use the objective 512 and be based on stochastic gradient descent with minibatch updates using feed-forward activation and back propagation of partial derivatives of the objective 512. This training process is well-known to those skilled in the art of training neural networks. In some embodiments, this supervised training may include additional training for members 501-503 of the pool of machine learning systems 500. After step 210, the computer system may return to step 204 to select more ordered pairs to be evaluated, based on similar considerations to those discussed above following step 209. If the computer system does not return to step 204 following step 210, the computer system may proceed to step 211 or may skip step 211, based on hyperparameters controlling the amount of pruning desired.

In some embodiments, in step 211, or at other places in the process, the computer system may optionally prune some of the arcs and nodes. Regularization, especially L1 regularization, may drive the weight parameter associated with a directed arc to the value 0. As specified by hyperparameters, the computer system may prune a directed arc, for example, if both the magnitude of its weight and the magnitude of the partial derivative of the objective with respect to the weight of the directed arc are close to zero (e.g., within a threshold of zero). A predefined function node and its incoming arcs may be pruned if all the connections from the predefined function node to a node in the upper network 505 have been pruned.

After step 211 or after step 210, if step 211 is skipped, the computer system chooses whether to return to step 201 or to terminate the training process. Terminating the process after 210 or after optional step 211 is equivalent to terminating after step 108 in FIG. 1. The possible stopping criteria are the same.

FIG. 3 is a diagram of a computer system 300 that could be used to implement the embodiments described above, such as the process described in FIG. 1. The illustrated computer system 300 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different networks or subnetworks or components. For example, in one embodiment, the cores of the first processor unit 302A may implement the pool of machine learning systems 500 and the second processor unit 302B may implement the neural networks 505 and 506. As another example, another multiple processor unit (not shown) may implement predefined network 504. Further, different sets of cores in the first and/or second processor units 302A, 302B may be responsible for different subnetworks in the machine learning systems 500 or different ensemble members where the machine learning systems 500 comprises an ensemble. One or more host processors 310 may coordinate and control the processor units 302A-B.

The processes depicted in FIGS. 1 and 2 can be embodied as a set of instructions stored within a memory (e.g., an integral memory of the processing units 302A, 302B or an off board memory 306A couple to the processing units 302A, 302B or other processing units) coupled to one or more processors (e.g., at least one of the sets of processor cores 304A-N of the processing units 302A, 302B or another processor(s) communicatively coupled to the processing units 302A, 302B), such that, when executed by the one or more processors, the instructions cause the processors to perform the aforementioned process by, for example, controlling the machine learning systems 500, 505, 506 stored in the processing units 302A, 302B.

In other embodiments, the system 300 could be implemented with one processor unit 302. In embodiments where there are multiple processor units, the processor units could be co-located or distributed. For example, the processor units 302 may be interconnected by data networks, such as a LAN, WAN, the Internet, etc., using suitable wired and/or wireless data communication links. Data may be shared between the various processing units 302 using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

An example of a feed forward neural network is shown in FIG. 4. A neural network comprises a set of nodes and a set of directed arcs. A feed forward neural network comprises an input layer, an output layer, and zero or more inner layers. An inner layer may also be called a "hidden" layer. FIG. 4 shows a neural network with an input layer, and output layer, and three hidden layers. Each directed arc connects a node in a lower layer, called its source node, to a node in a higher layer, called its destination node. Each node, except perhaps nodes in the input layer, is associated with a numerical value called the "bias" of the node. Each directed arc is associated with a numerical value called its "connection weight." The connection weights and node biases are called "learned" parameters. During training of a neural network, the values of the learned parameters are iteratively adjusted in an attempt to optimize a specified objective. Other parameters that are used to control the training process are called "hyperparameters."

In one general aspect, therefore, the present invention is directed to computer systems and computer-implemented methods for constructing a deep neural network. The method comprises adding, by a computer system 300 comprising one or more processor units 302, a multi-layer middle network 504 between an upper network 505 and a lower pool 500 of machine learning systems 501-503. The upper network 505 comprises a deep neural network and the middle network 504 comprises a deep neural network, and the pool 500 of machine learning systems comprises a plurality of diverse nodes that are diverse to each other. The computer system 300 adds the multi-layer middle network 504 layer-by-layer iteratively until a stopping criteria is met. Assuming there are n=1, . . . , N iterations, each iteration comprises adding one or more subnetwork elements (e.g., a node or a set of nodes) to the nth layer of the middle network, where each of the one or more subnetwork elements: (a) has an incoming directed arc from either (i) at least one of the plurality of diverse nodes of the pool 500 of machine learning systems and/or (ii) a node in a lower layer of the middle network; and (b) implements a predefined function. Each iteration further comprises adding one or more selected directed arcs between the middle network 504 and the upper network 505, where each selected directed arc is from (i) an output of the one or more subnetwork elements added to the middle network in the nth iteration to (ii) a node in the upper network. Each iteration also comprises training a composite network that comprises the upper network 505 and the middle network 504, where training the composite network comprises training the one or more selected directed arcs added between the middle network 504 and the upper network 505 in the 1st to nth iterations. Each processor unit 302 may comprise one or more processor cores 304 that are programmed to add the multi-layer middle network 504 as described. In various implementations, the multi-layer middle network comprises a feedforward neural network.

In various implementations, each machine learning system in the pool 500 of machine learning systems is a classifier trained to recognize a different classification category from the other machine learning systems in the pool of machine learning systems. Also, the pool 500 of machine learning systems may comprise an ensemble machine learning system, in which case each machine learning system in the pool of machine learning systems is an ensemble member of the ensemble machine learning system, such that each ensemble member is trained to be diverse from the other ensemble members in the ensemble machine learning system.

In various implementations, the predefined function implemented by at least one of the subnetwork elements comprises a Boolean function, e.g., A AND B, A OR B, A but not B, B but not A, A XOR B.

In various implementations, adding the one or more subnetwork elements to the nth layer of the middle network comprises adding a plurality of subnetwork elements in at least one of the N iterations. In that case, the plurality of subnetwork elements added in the at least one of the N iterations are not connected to each other. In that case, the step of training the one or more selected directed arcs added between the middle network and the upper network may comprises training, in parallel by the computer system, each of the plurality of unconnected subnetwork elements.

In various implementations, adding the one or more subnetwork elements to the nth layer of the middle network comprises adding a plurality of subnetwork elements in at least one of the N iterations, where at least two of the plurality of subnetwork elements added in the at least one of the N iterations share a node.

In various implementations, the step of training the one or more selected directed arcs added between the middle network and the upper network in the 1st to nth iterations comprises training the one or more selected directed arcs using an iterative training procedure, such as stochastic gradient descent.

In various implementations, the method further comprises, prior to adding the multi-layer middle network, training, by the computer system, the upper network according to a specified objective 512. The method may also comprise the step of, prior to adding the multi-layer middle network, training, by the computer system, each of the machine learning systems in the pool of machine learning systems. In various implementations, each of the machine learning systems in the pool of machine learning systems is either a classifier or detector, such that: (i) each machine learning system in the pool that is a classifier comprises an output node that indicates a classification category for the machine learning system; and (ii) each machine learning system in the pool that is a detector comprises an output node that indicates a detected feature for the machine learning system. In various implementations, each of the machine learning systems 501-503 in the pool 500 of machine learning systems comprises a neural network. Also, at least two of the neural networks may share a node.

In various implementations, the stopping criteria is that a specified number of iterations have been performed, that performance of the composite network on a set of validation data has degraded by more than a specified amount, or that a limit on a size of a composite network (e.g., in terms of the quantity of nodes and/or directed arcs) has been reached.

In various implementations, each iteration of adding the multi-layer middle network layer-by-layer iteratively until a stopping criteria is met comprises, prior to adding the one or more selected directed arcs, selecting by the computer system the one or more selected directed arcs to be added between the middle network and the upper network. In such circumstances, the one or more selected directed arcs may be selected by the computer system based on an estimate of a partial derivative of the specified objective 512 with respect to a weight for directed arcs between the middle network and the upper network. For example, directed arcs with greater magnitude absolute values may be more likely to be selected than directed arcs with lesser magnitude absolute values.

In various implementations, the composite network comprises is trained through supervised training, and the composite network may be trained through stochastic gradient descent according to, for example, to the specified objective 512. Also, the composite network may be considered to further comprise the pool 500 of machine learning systems, such that training the composite network comprises jointly training the upper network 505, the middle network 504, and the pool 500 of machine learning systems.

Based on the above description, it is clear that embodiments of the present invention can be used to improve many different types of machine learning systems, particularly neural networks. For example, embodiments of the present invention can improve recommender systems, speech recognition systems, and classification systems, including image and diagnostic classification systems, to name but a few examples.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for constructing a deep neural network, the method comprising adding, by a computer system comprising one or more processor units, a multi-layer middle network between an upper network and a lower pool of machine learning systems, wherein:
   the upper network comprises a deep neural network and the middle network comprises a deep neural network, wherein the deep neural network of the upper network comprises an input layer, an output layer, and at least one hidden layer between the input and output layers of the upper network;
   the pool of machine learning systems comprises a plurality of diverse nodes that are diverse to each other; and
   adding, by the computer system, the multi-layer middle network layer-by-layer iteratively until a stopping criteria is met, wherein there are n=1, . . . , N iterations, wherein N is an integer greater than one and wherein each iteration comprises:
      adding one or more subnetwork elements to the nth layer of the middle network, wherein each of the one or more subnetwork elements:
         has an incoming directed arc from either (i) at least one of the plurality of diverse nodes of the pool of machine learning systems and/or (ii) a node in a lower layer of the middle network; and
         implements a predefined function;
      adding one or more selected directed arcs between the middle network and the upper network, wherein each selected directed arc is from (i) an output of the one or more subnetwork elements added to the middle network in the nth iteration to (ii) a node in the upper network; and
      training a composite network that comprises the upper network and the middle network, wherein training the composite network comprises training the one or more selected directed arcs added between the middle network and the upper network in the 1st to nth iterations.

2. The method of claim 1, wherein each machine learning system in the pool of machine learning systems is a classifier trained to recognize a different classification category from the other machine learning systems in the pool of machine learning systems.

3. The method of claim 1, wherein:
   the pool of machine learning systems comprise an ensemble machine learning system;
   each machine learning system in the pool of machine learning systems is an ensemble member of the ensemble machine learning system; and
   each ensemble member is trained to be diverse from the other ensemble members in the ensemble machine learning system.

4. The method of claim 1, wherein the predefined function implemented by at least one of the subnetwork elements comprises a Boolean function.

5. The method of claim 1, wherein adding one or more subnetwork elements to the nth layer of the middle network comprises adding a plurality of subnetwork elements in at least one of the N iterations.

6. The method of claim 5, wherein the plurality of subnetwork elements added in the at least one of the N iterations are not connected to each other.

7. The method of claim 6, wherein, upon an occurrence that a plurality of unconnected subnetwork elements are added to the middle network in the at least one of the N iterations, the step of training the one or more selected directed arcs added between the middle network and the upper network comprises training, in parallel by the computer system, each of the plurality of unconnected subnetwork elements.

8. The method of claim 1, wherein:
   adding one or more subnetwork elements to the nth layer of the middle network comprises adding a plurality of subnetwork elements in at least one of the N iterations; and
   at least two of the plurality of subnetwork elements added in the at least one of the N iterations share a node.

9. The method of claim 1, wherein the step of training the one or more selected directed arcs added between the middle network and the upper network in the 1st to nth iterations comprises training the one or more selected directed arcs using an iterative training procedure.

10. The method of claim 9, wherein the iterative training procedure comprises stochastic gradient descent.

11. The method of claim 1, further comprising, prior to adding the multi-layer middle network, training, by the computer system, the upper network according to a specified objective.

12. The method of claim 11, further comprising, prior to adding the multi-layer middle network, training, by the computer system, each of the machine learning systems in the pool of machine learning systems.

13. The method of claim 12, wherein each of the machine learning systems in the pool of machine learning systems is either a classifier or detector, wherein:
- each machine learning system in the pool that is a classifier comprises an output node that indicates a classification category for the machine learning system; and
- each machine learning system in the pool that is a detector comprises an output node that indicates a detected feature for the machine learning system.

14. The method of claim 13, wherein each of the machine learning systems in the pool of machine learning systems comprises a neural network.

15. The method of claim 14, wherein the pool of machine learning systems comprises at least two neural networks that share a node.

16. The method of claim 1, wherein the multi-layer middle network comprises a feedforward neural network.

17. The method of claim 1, wherein the stopping criteria comprises that a specified number of iterations have been performed.

18. The method of claim 1, wherein the stopping criteria comprises that performance of the composite network on a set of validation data has degraded by more than a specified amount.

19. The method of claim 1, wherein the stopping criteria comprises that a limit on a size of a composite network has been reached.

20. The method of claim 11, wherein each iteration of adding the multi-layer middle network layer-by-layer iteratively until a stopping criteria is met comprises, prior to adding the one or more selected directed arcs, selecting by the computer system the one or more selected directed arcs to be added between the middle network and the upper network.

21. The method of claim 20, wherein the one or more selected directed arcs are selected by the computer system based on an estimate of a partial derivative of the specified objective with respect to a weight for directed arcs between the middle network and the upper network.

22. The method of claim 21, wherein the one or more selected directed arcs are selected by the computer system based on an absolute value of the estimate of the partial derivative of the specified objective with respect to a weight for the directed arcs between the middle network and the upper network, such that directed arcs with greater magnitude absolute values are more likely to be selected than directed arcs with lesser magnitude absolute values.

23. The method of claim 11, wherein training the composite network comprises training the composite network through supervised training.

24. The method of claim 23, wherein training the composite network comprises training the composite network through stochastic gradient descent.

25. The method of claim 24, wherein training the composite network comprises training the composite network according to the specified objective.

26. The method of claim 11, wherein the composite network further comprises the pool of machine learning systems, such that training the composite network comprises jointly training the upper network, the middle network, and the pool of machine learning systems.

27. The method of claim 20, wherein selecting the one or more selected directed arcs to be added between the middle network and the upper network comprises, for each iteration:
- for each of a plurality of ordered pairs (x,y), where x is a node in the middle network and y is a node in the upper network, computing, by the computer system, an estimate of a partial derivative of the specified objective with respect to a weight for a directed arc from node x to node y; and
- selecting, by the computer system, each ordered pair (x,y) whose magnitude of the computed estimate is greater than a threshold value, such that each of the selected ordered pairs (x,y) corresponds to a directed arc from node x of the ordered pair to node y of the ordered pair.

28. The method of claim 20, wherein selecting the one or more selected directed arcs to be added between the middle network and the upper network comprises, for each iteration:
- for each of a plurality of ordered pairs (x.y), where x is a node in the middle network and y is a node in the upper network, computing, by the computer system, an estimate of a partial derivative of the specified objective with respect to a weight for a directed arc from node x to node y;
- ranking, by the computer system, the plurality of ordered pair (x,y) based on a magnitude of the estimate; and
- selecting, by the computer system, one or more of the ordered pairs (x,y) based on the ranking, such that each of the selected ordered pairs (x,y) corresponds to a directed arc from node x of the ordered pair to node y of the ordered pair.

29. The method of claim 28, wherein selecting the one or more ordered pairs (x,y) comprises selecting a predetermined quantity of the highest ranking ordered pairs (x,y) in the ranking.

30. The method of claim 28, wherein selecting the one or more ordered pairs (x,y) comprises selecting a predetermined percentage of the highest ranking ordered pairs (x,y) in the ranking.

31. A computer system for constructing a deep neural network, the computer system comprising one or more processor cores that are programmed to add a multi-layer middle network between an upper network and a lower pool of machine learning systems, wherein:
- the upper network comprises a deep neural network and the middle network comprises a deep neural network, wherein the deep neural network of the upper network comprises an input layer, an output layer, and one or more hidden layers between the input and output layers of the upper network;
- the pool of machine learning systems comprises a plurality of diverse nodes that are diverse to each other; and
- the one or more processor cores of the computer system are programmed to add the multi-layer middle network layer-by-layer iteratively until a stopping criteria is met, wherein there are n=1, . . . , N iterations, wherein N is an integer greater than one and wherein each iteration comprises:
  - adding one or more subnetwork elements to the nth layer of the middle network, wherein each of the one or more subnetwork elements:
    - has an incoming directed arc from either (i) at least one of the plurality of diverse nodes of the pool of machine learning systems and/or (ii) a node in a lower layer of the middle network; and
    - implements a predefined function;
  - adding one or more selected directed arcs between the middle network and the upper network, wherein each selected directed arc is from (i) an output of the one or more subnetwork elements added to the middle network in the nth iteration to (ii) a node in the upper network; and training a composite network that comprises the upper network and the middle network, wherein training the composite network comprises training the one or more selected directed arcs added between the middle network and the upper network in the 1st to nth iterations.

32. The computer system of claim 31, wherein each machine learning system in the pool of machine learning systems is a classifier trained to recognize a different classification category from the other machine learning systems in the pool of machine learning systems.

33. The computer system of claim 31, wherein:
the pool of machine learning systems comprise an ensemble machine learning system;
each machine learning system in the pool of machine learning systems is an ensemble member of the ensemble machine learning system; and
each ensemble member is trained to be diverse from the other ensemble members in the ensemble machine learning system.

34. The computer system of claim 31, wherein the predefined function implemented by at least one of the subnetwork elements comprises a Boolean function.

35. The computer system of claim 31, wherein one or more processor cores are programmed to add the one or more subnetwork elements to the nth layer of the middle network by adding a plurality of subnetwork elements in at least one of the N iterations.

36. The computer system of claim 35, wherein the plurality of subnetwork elements added in the at least one of the N iterations are not connected to each other.

37. The computer system of claim 36, wherein:
the one or more processor cores comprise T sets of processor cores, where T >1 and each of the T sets comprises one or more processor cores; and
upon an occurrence that T unconnected subnetwork elements are added to the middle network in the at least one of the N iterations, each of the T sets of processor cores individually and in parallel trains the plurality of unconnected subnetwork elements.

38. The computer system of claim 31, wherein the one or more processor cores are programmed to add the one or more subnetwork elements to the nth layer of the middle network by adding a plurality of subnetwork elements in at least one of the N iterations such that at least two of the plurality of subnetwork elements added in the at least one of the N iterations share a node.

39. The computer system of claim 31, wherein the one or more processor cores are programmed to train the one or more selected directed arcs added between the middle network and the upper network in the 1st to nth iterations by training the one or more selected directed arcs using an iterative training procedure.

40. The computer system of claim 39, wherein the iterative training procedure comprises stochastic gradient descent.

41. The computer system of claim 31, wherein the one or more processor cores are further programmed to, prior to adding the multi-layer middle network, training the upper network according to a specified objective.

42. The computer system of claim 41, wherein the one or more processor cores are further programmed to, prior to adding the multi-layer middle network, training each of the machine learning systems in the pool of machine learning systems.

43. The computer system of claim 42, wherein each of the machine learning systems in the pool of machine learning systems is either a classifier or detector, wherein:
each machine learning system in the pool that is a classifier comprises an output node that indicates a classification category for the machine learning system; and
each machine learning system in the pool that is a detector comprises an output node that indicates a detected feature for the machine learning system.

44. The computer system of claim 43, wherein each of the machine learning systems in the pool of machine learning systems comprises a neural network.

45. The computer system of claim 42, wherein the pool of machine learning systems comprises at least two neural networks that share a node.

46. The computer system of claim 31, wherein the multi-layer middle network comprises a feedforward neural network.

47. The computer system of claim 31, wherein the stopping criteria comprises that a specified number of iterations have been performed.

48. The computer system of claim 31, wherein the stopping criteria comprises that performance of the composite network on a set of validation data has degraded by more than a specified amount.

49. The computer system of claim 31, wherein the stopping criteria comprises that a limit on a size of a composite network has been reached.

50. The computer system of claim 41, wherein the one or more processor cores are further programmed to, as part of each iteration of adding the multi-layer middle network layer-by-layer iteratively until a stopping criteria, prior to adding the one or more selected directed arcs, selecting the one or more selected directed arcs to be added between the middle network and the upper network.

51. The computer system of claim 50, wherein the one or more processor cores are programmed to select the one or more directed arcs to be added between the middle network and the upper network based on an estimate of a partial derivative of the specified objective with respect to a weight for directed arcs between the middle network and the upper network.

52. The computer system of claim 51, wherein the one or more selected directed arcs are selected by the computer system based on an absolute value of the estimate of the partial derivative of the specified objective with respect to a weight for the directed arcs between the middle network and the upper network, such that directed arcs with greater magnitude absolute values are more likely to be selected than directed arcs with lesser magnitude absolute values.

53. The computer system of claim 41, wherein the one or more processor cores are programmed to train the composite network through supervised training.

54. The computer system of claim 53, wherein the one or more processor cores are programmed to training the composite network through stochastic gradient descent.

55. The computer system of claim 54, wherein the one or more processor cores are programmed to training the composite network according to the specified objective.

56. The computer system of claim 41, wherein the composite network further comprises the pool of machine learning systems, such that training the composite network comprises jointly training the upper network, the middle network, and the pool of machine learning systems.

57. The computer system of claim 50, wherein the one or more processor cores are further programmed to select the one or more selected directed arcs to be added between the middle network and the upper network by, for each iteration:

for each of a plurality of ordered pairs (x.y), where x is a node in the middle network and y is a node in the upper network, computing an estimate of a partial derivative of the specified objective with respect to a weight for a directed arc from node x to node y; and selecting each ordered pair (x,y) whose magnitude of the computed estimate is greater than a threshold value, such that each of the selected ordered pairs (x,y) corresponds to a directed arc from node x of the ordered pair to node y of the ordered pair.

58. The computer system of claim 50, wherein the one or more processor cores are further programmed to select the one or more selected directed arcs to be added between the middle network and the upper network by, for each iteration:

for each of a plurality of ordered pairs (x.y), where x is a node in the middle network and y is a node in the upper network, computing an estimate of a partial derivative of the specified objective with respect to a weight for a directed arc from node x to node y;

ranking the plurality of ordered pair (x,y) based on a magnitude of the estimate; and selecting one or more of the ordered pairs (x,y) based on the ranking, such that each of the selected ordered pairs (x,y) corresponds to a directed arc from node x of the ordered pair to node y of the ordered pair.

59. The computer system of claim 58, wherein the one or more processor cores are further programmed to select the one or more ordered pairs (x,y) by selecting a predetermined quantity of the highest ranking ordered pairs (x,y) in the ranking.

60. The computer system of claim 58, wherein the one or more processor cores are further programmed to select the one or more ordered pairs (x,y) by selecting a predetermined percentage of the highest ranking ordered pairs (x,y) in the ranking.

* * * * *